(12) United States Patent
Kalmbach

(10) Patent No.: US 10,011,039 B2
(45) Date of Patent: Jul. 3, 2018

(54) MACHINING DEVICE

(71) Applicant: Homag Holzbearbeitungssysteme GmbH, Schopfloch (DE)

(72) Inventor: Wilhelm Kalmbach, Schopfloch (DE)

(73) Assignee: HOMAG HOLZBEARBEITUNGSSYSTEME GMBH, Schopfloch (DE)

( * ) Notice: Subject to any disclaimer, the term of this patent is extended or adjusted under 35 U.S.C. 154(b) by 301 days.

(21) Appl. No.: 14/572,829

(22) Filed: Dec. 17, 2014

(65) Prior Publication Data

US 2016/0136838 A1    May 19, 2016

(30) Foreign Application Priority Data

Dec. 17, 2013 (DE) .................. 10 2013 226 214

(51) Int. Cl.
*B27C 9/02* (2006.01)
*B27D 5/00* (2006.01)
(Continued)

(52) U.S. Cl.
CPC ............... *B27C 9/02* (2013.01); *B23C 3/122* (2013.01); *B27C 5/00* (2013.01); *B27D 5/006* (2013.01); *B27G 13/007* (2013.01)

(58) Field of Classification Search
CPC .......... B23C 3/12; B23C 3/126; B23C 3/128; B23C 5/12; B23C 5/08; Y10T 407/1902;
(Continued)

(56) References Cited

U.S. PATENT DOCUMENTS 3,490,118 A * 1/1970 Corti .................. B27G 13/10
                                                           144/236
5,063,980 A * 11/1991 Schultz .................. B23C 3/126
                                                           144/218
(Continued)

FOREIGN PATENT DOCUMENTS

CH      682469 A5    9/1993
CN     2825246 Y    10/2006
(Continued)

OTHER PUBLICATIONS

German Search Report from the German Patent and Trademark Office dated Aug. 21, 2014 with respect to priority application DE 10 2013 226 214.0. While written comments are in German, references of GPO are specifically cited.
(Continued)

*Primary Examiner* — Matthew G Katcoff
(74) *Attorney, Agent, or Firm* — Scott R. Cox

(57) ABSTRACT

A device and a method for machining a workpiece are provided, wherein said workpiece includes segments of wood, wood-based materials, synthetic material or the like, having a first milling tool for contour machining an edge attached to said workpiece, a second milling tool for contour machining the edge attached to said workpiece, which is adjustable in relation to said first milling tool between a resting position, in which said first milling tool is engageable with the workpiece, and a machining position, in which said second milling tool is engageable with a workpiece. The device is characterized by a third milling tool for flush milling a narrow side of the edge attached to said workpiece, the three milling tools being arranged coaxially to each other and all are jointly drivable by one device.

12 Claims, 3 Drawing Sheets

(51) Int. Cl.
*B27G 13/00* (2006.01)
*B23C 3/12* (2006.01)
*B27C 5/00* (2006.01)

(58) Field of Classification Search
CPC .......... B23F 21/28; B23F 21/26; B23F 21/12; B27G 13/00; B27G 13/002; B27G 13/02; B27G 13/04; B27G 13/06; B27G 13/08; B27G 13/10; B27G 13/12; B27G 13/14; B27G 13/16
See application file for complete search history.

(56) References Cited

U.S. PATENT DOCUMENTS

| | | | |
|---|---|---|---|
| 5,983,967 A * | 11/1999 | Gross | B27B 33/20 144/176 |
| 7,713,005 B2 * | 5/2010 | Rieth | B23C 3/126 407/113 |

FOREIGN PATENT DOCUMENTS

| | | | |
|---|---|---|---|
| CN | 102581481 A | 7/2012 | |
| CN | 202964821 U | 6/2013 | |
| DE | 3029433 A1 | 3/1982 | |
| DE | 4419324 A1 | 12/1995 | |
| DE | 10341463 A1 | 4/2005 | |
| DE | 110211004536 A1 | 8/2012 | |
| DE | 102013010359 A1 | 12/2013 | |
| EP | 2363259 A1 | 9/2011 | |
| EP | 2492071 A2 | 8/2012 | |

OTHER PUBLICATIONS

Extended European Search Report from the European Patent Office dated Apr. 15, 2015 with respect to EP Application No. 14198218.1, priority application DE 10 2013 226 214.0. While written comments are in German, references of EPO are specifically cited.

Chinese Search Report to parallel Chinese Patent Application 201410787716.0. dated Jan. 29, 2018 cited only for references disclosed therein.

European Examination Report issued Feb. 15, 2017 with respect to parallel European patent application No. 14 198 218.1—cited only for reference that is disclosed therein.

* cited by examiner

MACHINING DEVICE

TECHNICAL FIELD

The present invention relates to a device for machining a workpiece which consists preferably at least in segments of wood, wood-based materials, synthetic material or the like according to the preamble of claim 1, as well as to a method for machining a workpiece using this device.

PRIOR ART

In the furniture and construction element industries, edges or narrow surface coating strips are glued onto the narrow sides of workpiece boards, e.g. solid wood boards or chipboards, lightweight boards, sandwich boards or the like. These glued-on edges are milled both on their upper and lower sides and on the front and rear end faces of the workpiece to be flush with the respectively adjacent surface of the workpiece. Moreover, various contours, e.g. chamfers or radii, are provided on the edges.

The applicant is aware only of devices and methods in which flush milling machining is carried out in a first machining station, and the edge is provided with different contours in a further machining station which is located separately from the first machining station.

The machining station for flush milling can be designed to accord with the device disclosed in EP 2 181 816 A1.

The machining station located to be separate therefrom for contour machining the workpiece edge can be configured to be a close copy of the device disclosed in DE 199 15 672 C2. This device comprises two milling tools for contour machining a workpiece edge, which are each engageable with an edge to be machined via a relative adjusting movement.

However, the devices and methods in the prior art have the disadvantages of high system and operating costs and of a high space requirement.

DESCRIPTION OF THE INVENTION

Thus, the object of the present invention is to provide a device and a method for machining an edge attached to a workpiece, which have low investment and operating costs as well as a low space requirement.

The invention is based on the idea that the reasons for the high system and operating costs as well as the high space requirement for the devices in the prior art are that they require at least two milling aggregates for the complete contour machining of an edge attached to a workpiece, i.e. a first aggregate for flush milling and a further aggregate for contour machining. These cost-intensive machining aggregates cause the high system costs of the entire device and are the reason for the high operating costs since energy and operational resources have to be provided for two machining aggregates. Furthermore, the configuration in the prior art results in a high space requirement for the device since a machining room has to be provided for two aggregates.

The present invention provides a device and a method with which the different edge machinings, i.e. the contour machining and flush milling machining, can be carried out with one machining aggregate. For this purpose, the device comprises a first milling tool for contour machining an edge attached to a workpiece, a second milling tool for contour machining an edge attached to said workpiece, which tool is adjustable in relation to said first milling tool between a resting position in which said first milling tool is engageable with the workpiece and a machining position in which said second milling tool is engageable with the workpiece. The device is characterized in that it further comprises a third milling tool for flush milling a narrow side of an edge attached to the workpiece, the three milling tools being arranged coaxially to each other and being jointly drivable by one device. Reference is to be made here to the fact that the first and second milling tools can be a tool for producing a radius, a tool for producing a chamfer or the like. A tool allowing the machining of both a chamfer and a radius is also conceivable.

It is possible with the device according to the invention to completely machine an edge attached to a workpiece using just one machining aggregate. The device according to the invention provides on this one aggregate at least two, preferably various, contour machinings as well as flush milling machining. Therefore, the device has a low space requirement since only one machining room has to be provided for one machining aggregate. Moreover, the device according to the invention achieves low system and operating costs since only one machining aggregate has to be provided and operated.

The third milling tool preferably comprises a peripheral area having a consistent diameter. This allows the simple feeding of the third milling tool for flush milling to the workpiece since the coaxial axis of the device can be arranged parallel to the surface of the workpiece in this preferred configuration during flush milling. A good machining quality can also be achieved since all of the points on the peripheral area of the workpiece have the same speed. Furthermore, this embodiment leads to a more economical device with a simple construction.

The device can be configured such that the tool base diameters of the first and second milling tools correspond to each other. The tool base diameter is understood within the framework of the present invention to be the diameter of a tool at which a tool-specific tool design starts at the outer surface of said tool. With reference to the workpiece shown as an example in the enclosed FIG. 1, the tool base diameter is the tool diameter from the point on the outer contour of the tool, where the radius characteristic for the milling tool starts for contour machining. The tangential finishing area of the tool between the starting point of this tool-specific design and the corner point of the tool is the same in the tools shown here and is therefore not tool-specific. In other words, the tool base diameter is a reference parameter to the workpiece, which indicates at what distance the tool axis has to be arranged from a workpiece surface to achieve a desired machining. Hence, the tool base diameter is the effective diameter.

During operation of the device, this preferred configuration has the effect that two different contour machinings, particularly radii and/or chamfers, can be realized on one workpiece merely by the adjusting movement of the movable second milling tool, without changing the position or replacing the machining device. Thus, a first and second contour machining are made possible with only the help of a sensing roller which delivers the tool at a predetermined distance to the workpiece, thus constitutes the reference parameter to the workpiece. The at least two contours can be easily changed by the adjustment, which results in lower production times and thus lower production costs. This configuration also results in lower set-up times.

According to a preferred embodiment, the tool base diameter of the first and/or second milling tool is smaller than the tool base diameter of the third milling tool. This results in an easily manageable device since the third milling tool required for flush milling is engageable first with the workpiece during tool feed to the workpiece.

It is also conceivable that the tool base diameter of the third milling tool is smaller than or equal to the tool base diameter of the first and/or second milling tools. Thus, a simultaneous flush and contour milling can be carried out, for instance, since during a specific tool feed to the workpiece both the third milling tool and the first and/or second milling tools are engageable with the workpiece. The result is an efficient and thus economical machining.

Moreover, the device can have a fourth milling tool for contour machining an edge attached to the workpiece. This fourth milling tool comprises preferably a tool base diameter equal to the tool base diameter of the third milling tool. With this preferred configuration, three different contour machinings can be provided on one device, a simultaneous flush and contour milling also being made possible. As described above, this allows an efficient workpiece machining and thus reduces the production costs.

The third and fourth milling tools can be formed as one component. This preferred configuration leads to a device having low complexity since just one tool suspension or mount is necessary for two workpieces. Furthermore, simultaneous flush milling and contour machining allows a good machining quality to be achieved since there are no relative displacements between the simultaneously engaged workpieces.

In one preferred embodiment, the milling tools are arranged one after the other according to their numbering. This configuration results in a particularly simply constructed device since the tools for contour machining are each disposed at the front or rear end of the flush milling tool, by which an easy feed of the individual milling tools to the workpiece is provided and sufficient space for the arrangement of the tool mounts.

The first and third milling tools can be formed as one component, which results in the same advantages as those described above with regard to the third and fourth milling tools.

The third milling tool can also be formed as one component with the second milling tool, which results in the same advantages and moreover allows in a switch between face milling machining and contour machining via the adjusting mechanism of the second milling tool.

In a further preferred embodiment, the device additionally comprises an adjusting device for moving at least one of the milling tools in the direction of the coaxial axis of the device. Preferably, all of the milling tools can be moved in the direction of the coaxial axis of the device by this adjusting device. In this preferred embodiment, a simple switching is therefore possible between the different machining options provided with the device according to the invention, i.e. between different contour machinings and face milling machining. Optionally, the adjusting device can also be adjustable in one direction or a plurality of directions preferably perpendicular to the coaxial axis direction of the device.

It is another object of the present invention to provide a method for machining a workpiece which consists preferably at least in segments of wood, wood-based materials, synthetic material or the like, by using a device according to one of the above-described embodiments. This method comprises the step of flush milling a narrow side of an edge attached to the workpiece using the third milling tool, the step of contour machining an edge attached to the workpiece using the first milling tool, the second milling tool being in a resting position, the step of adjusting the second milling tool to the machining position, and the step of contour machining an edge attached to the workpiece using the first milling tool. The method leads to the same advantages as those which have been stated above with regard to the device.

Preferably, the method further comprises the step of contour machining an edge attached to the workpiece using the fourth milling tool, the contour machining preferably taking place at least at times simultaneously with the flush milling of the narrow side by the third milling tool. This preferred embodiment results in a preferably time-efficient and thus economical machining.

DETAILED DESCRIPTION OF A PREFERRED EMBODIMENT

Figure 1:
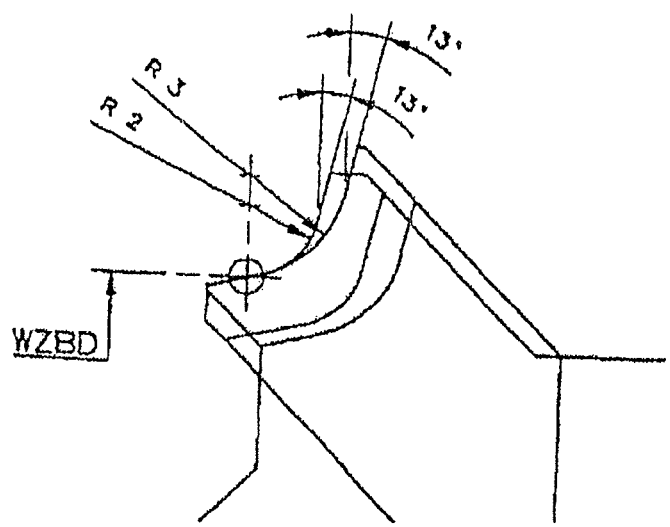
FIG. 1 is a view illustrating the tool base diameter on an exemplary workpiece.
Figure 2:
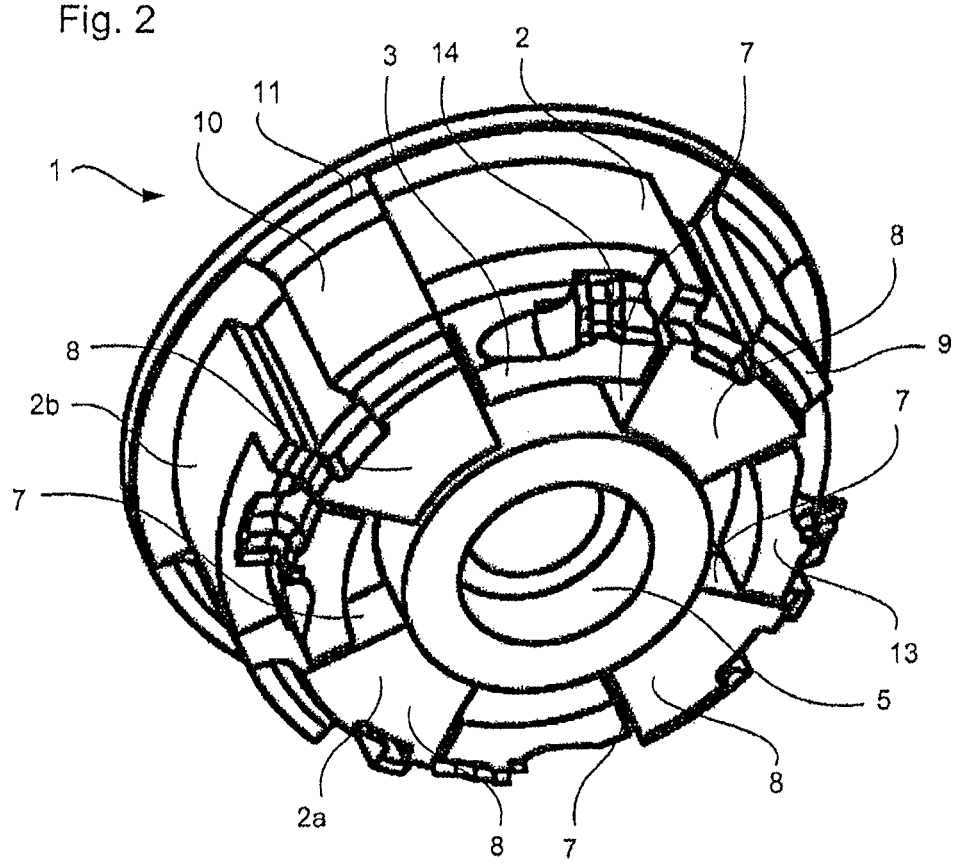
FIG. 2 is an isometric view of the device according to a preferred embodiment of the present invention.
Figure 3:
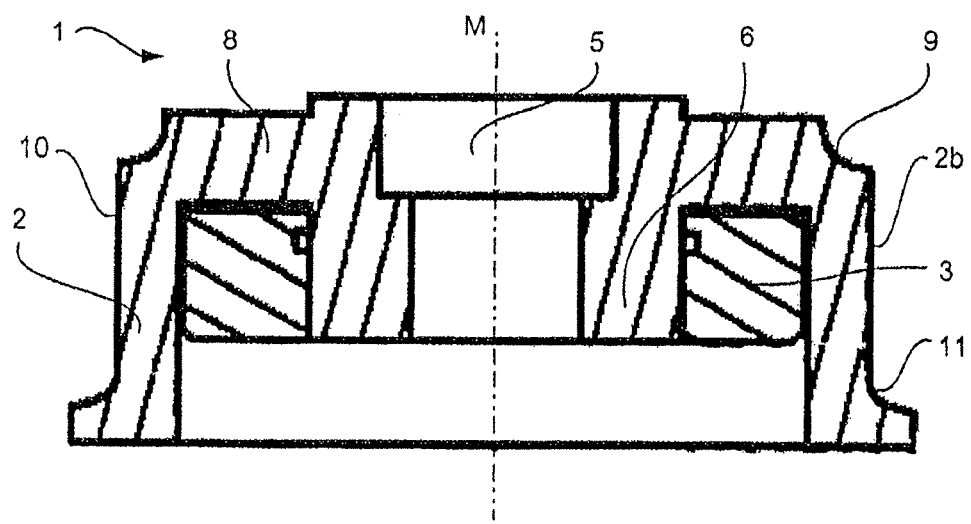
FIG. 3 is a cross-sectional view of the device according to the preferred embodiment of the present invention, in which mainly the first, third and fourth milling tools are depicted.
Figure 4:
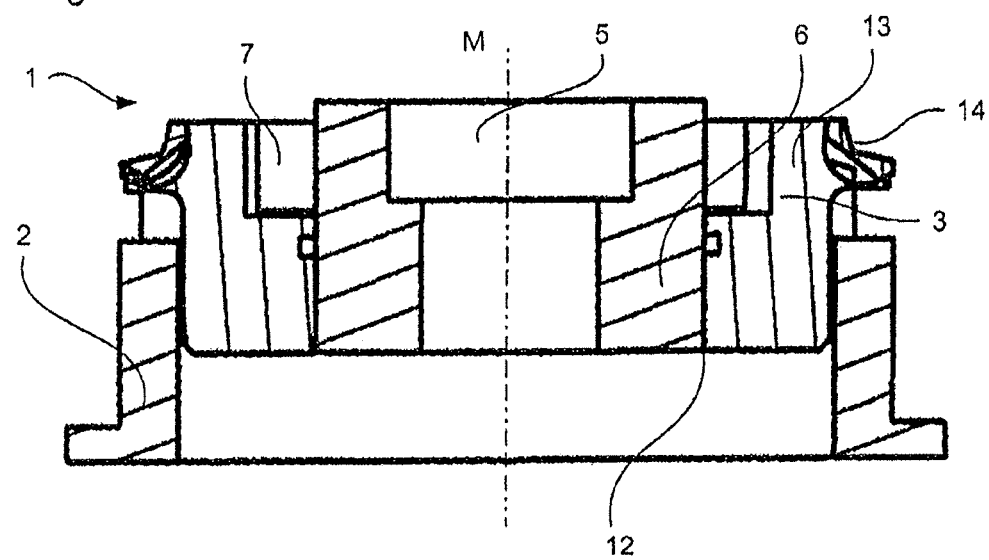
FIG. 4 is a cross-sectional view of the device according to the preferred embodiment of the present invention, in which mainly the second milling tool is depicted.

An advantageous embodiment of the present invention will be described in detail below with reference to FIGS. 2, 3, 4, 5A, 5B, 6A and 6B.

The preferred embodiment of the device in accordance with the invention described below is preferably used for the machining of an edge attached to a workpiece. Preferably, the workpiece consists at least in segments of wood, wood-based materials, synthetic material or the like. This can be, e.g., a solid wood board or chipboard, a lightweight board, a sandwich board or the like, as are used, e.g., in the furniture and construction element industries.

The attached edge is preferably an edge strip which can be made of different materials such as synthetic veneer, paper, cardboard, metal, etc. and various combinations thereof. Preferably, the edge strip is provided in the form of a roll, but can also be provided, e.g., in the form of individual segments. Moreover, the edge strip can have a functional layer which develops adhesive properties by means of energy input (e.g. heating or laser radiation), so that the edge strip can be attached to a workpiece via the functional layer.

Device 1 of the present, preferred embodiment has essentially three components, i.e. a tool base support 2, a tool adjusting support 3 as well as an adjusting device 4.

The tool base support 2 essentially has a cup shape, thus a hollow cylinder shape with a closed end face 2a and an open end face. The base support 2 of this preferred embodiment has a centrally arranged, lowered bore 5 in its closed end face 2a. The bore 5 extends through the closed end face 2a of the base support 2 and through a projection 6 protruding into the inside of the base support 2. The projection 6 is axisymmetrical to the central axis M of the base support 2, extends from the inner surface of the end face 2a to about half the length of the base support and has an outer diameter which corresponds to about half the outer diameter of the surface area of the tool base support 2.

On the closed end face 2a of the base support 2, there are also preferably four recesses 7 equiangularly distributed on the surface, extending from about half the maximum radius of the end face 2a to the maximum radius of the end face 2a and in the direction of the central axis M of the tool base support 2 to about half the length of the base support into the surface area. Preferably, the radius, at which the recesses 7 start on the closed end face 2a, corresponds to the outer radius of the projection 6. Owing to the above-described cup shape of the tool base support 2, the support thus has four openings 7 disposed on the closed end face and the front surface area. Preferably, the openings 7 comprise about 45° of the end face 2a of the base support 2 in each case, and a strip 8 is arranged at about 45° between the single openings 7.

Preferably, the surface area 2b of the tool base support 2 consists of three essential segments. The base support 2 first of all comprises, from the closed end face 2a in the direction of the central axis M of the base support 2, a first milling tool 9 for contour machining an edge of a workpiece. In this preferred embodiment, the first milling tool 9 is formed as a tool for producing a radius on an edge of a workpiece, any other tools for contour machining being conceivable here, e.g. a tool for producing a chamfer. The first milling tool 9 is formed in the frontmost area of the strips 8, said first milling tool preferably extending in the circumferential direction only along one portion of the respective strips 8. In the present embodiment, each of the end areas of the strips 8 is slightly raised radially in relation to the immediate surroundings so that these raised parts can act as cutting edges. The cutting edges are formed to be sharpenable. Alternatively, cutting inserts can also be provided. This configuration of the cutting edges also applies to the milling tools described below.

In the direction of the central axis M, adjacent to the first milling tool 9, the tool base support 2 has a second section on the surface area 2b having a third milling tool 10 for flush milling a narrow side of an edge attached to a workpiece. Preferably, the outer diameter of the base support 2 is consistent in the area of this third milling tool 10. It is pointed out that other embodiments for the third tool 10 are also conceivable here which must, however, be suitable for flush milling a narrow side of an edge attached to a workpiece. For instance, the surface area can be arranged at an angle with respect to the central axis M of the base support 2.

In the direction of the central axis M, adjacent to the third milling tool 10, the base support 2 has a fourth milling tool 11 for contour machining an edge attached to a workpiece. Preferably, the outer diameter of the fourth milling tool 11 is larger than the outer diameter of the third milling tool 10. The tool base diameter of the fourth milling tool 11, thus the diameter at which the radius of the tool starts, corresponds to the tool base diameter of the third milling tool 10, thus the outer diameter. In this preferred embodiment, the tool base diameter of the first milling tool 9 is smaller than the tool base diameter of the third milling tool 10 and of the fourth milling tool 11.

Moreover, the device 1 comprises the tool adjusting support 3. The adjusting support 3 is formed axisymmetric and essentially has an outer diameter which corresponds approximately to the inner diameter of the tool base support 2. Furthermore, the tool adjusting support 3 has a centrally arranged bore 12 with a diameter which corresponds approximately to the outer diameter of the projection 6 of the tool base support 2. The tool adjusting support 3 is inserted into the base support 2 such that said tool adjusting support 3 is guidingly movable through the protrusion 6 and the inner side of the base support 2 in the direction of the central axis M.

The adjusting support 3 further comprises, on one of the end faces of this embodiment, four protrusions 13 which are formed such that they fit into the recesses 7 of the base support 2. A second milling tool 14 for contour machining an edge attached to the workpiece is mounted in the front area of the protrusions 13. In this preferred embodiment, this second milling tool 14 is formed only in a partial area of the protrusion 13, the following invention not being restricted hereto. In this preferred embodiment, the second milling tool 14 is a tool for providing a workpiece edge with a radius or chamfer. The provided radius of the second milling tool 14 is preferably different from the radius provided by the first milling tool 9. In this preferred embodiment, the main workpiece diameter of the second milling tool 14 is equal to the main workpiece diameter of the first milling tool 9. Thus, by an adjusting movement of the adjusting support 3 in the direction of the central axis M, it is possible to switch between an engagement of the first milling tool 9 and an engagement of the second milling tool 14 with the workpiece to be machined. Possible, more detailed embodiments of this part of device 1 can be found in patent specification DE 199 15 672 C2.

Figure 5A:
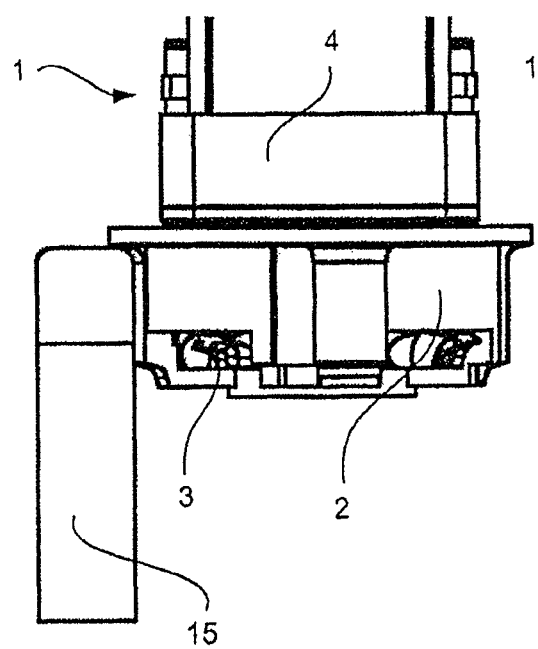
FIG. 5A shows a flush milling machining by the third milling tool with additional contour machining by the fourth milling tool.
Figure 5B:
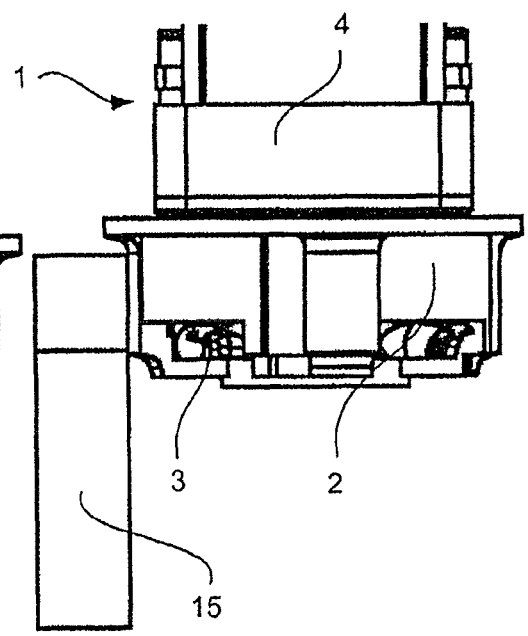
FIG. 5B shows a flush milling machining by the third milling tool of a workpiece with the preferred embodiment of the device according to the present invention.
Figure 6A:
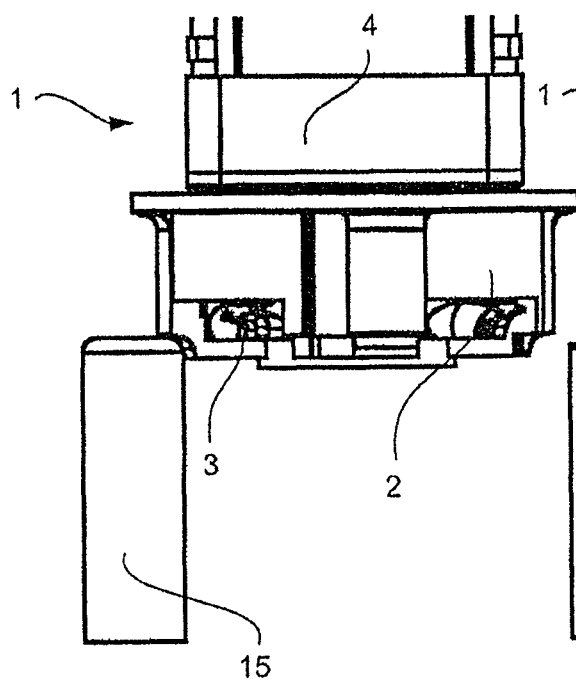
FIG. 6A shows a contour machining by the first milling tool, in which the second milling tool is in the resting position.
Figure 6B:
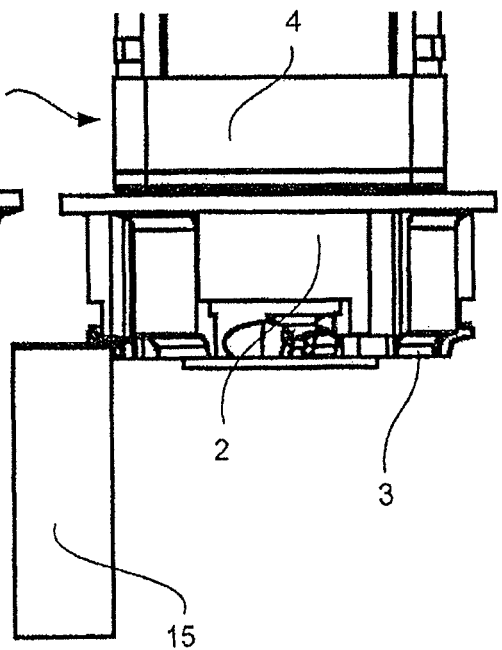
FIG. 6B shows a contour machining by the second milling tool, which is in the machining position, of a workpiece having the preferred embodiment of the device according to the present invention.

FIGS. 5A, 5B, 6A and 6B show different machining processes that are possible with the device 1 of the preferred embodiment described above. In FIG. 5A, a machining process is shown, in which a narrow side of an edge attached to a workpiece 15 is flush milled using the third milling tool 10 and, at the same time, the edge is contour-machined, i.e. provided with a radius in the present case, by the fourth milling tool 11. As shown in FIG. 5B, the present device 1 also allows an exclusive flush milling of the narrow side of the workpiece 15 using the third milling tool 10. For this purpose, the device 1 is adjusted by the adjusting device 4 relative to the workpiece 15 in the direction of the central axis M in a manner that only the third milling tool 10 is engaged with the workpiece 15. FIG. 6A shows a further machining process, in which the first milling tool 9 carries out a contour machining on the workpiece 15, i.e. a radius machining. In this machining process, the adjusting support 3, thus the second milling tool 14, is in the resting position so that only the first milling tool 9 is engaged with the workpiece 15. The adjusting process from the machining process shown in FIG. 5B to the machining process shown in FIG. 6A is carried out by the adjusting device 4 which adjusts the device 1 in the direction of the central axis M. FIG. 6B shows a further machining process, in which a workpiece edge 15 is contour machined by the second milling tool 14, i.e. is radius machined. To achieve this, the adjusting support 3, i.e. the second milling tool 14, is adjusted into the machining position so that the second milling tool 14 is engageable with the workpiece. The adjustment of the adjusting support 3 and/or the entire device 1 by the adjusting device 4 can be made electrically, hydraulically, pneumatically or in any other manner. It is also conceivable that the adjusting device 4 can adjust the device 1 not only in the direction of the central axis M, but also in other directions preferably perpendicular to the central axis M.

The invention claimed is:
1. A rotary cutting device for machining a workpiece which includes segments of wood, wood-based materials, or synthetic materials, comprising
   a first milling tool for contour machining an edge attached to said workpiece,
   a second milling tool for contour machining the edge attached to said workpiece, which second milling tool is adjustable in relation to said first milling tool between a resting position, in which said first milling tool is engageable with the workpiece, and a machining position, in which said second milling tool is engageable with the workpiece,
   characterized in that said device further comprises
   a third milling tool for flush milling a narrow side of the edge attached to said workpiece,
   wherein said three milling tools are arranged coaxially to each other and wherein all are jointly drivable by one device and wherein a tool base diameter of said first milling tool and said second milling tool is smaller than a tool base diameter of said third milling tool.

2. The device according to claim 1, in which a peripheral area of said third milling tool has a consistent diameter.

3. The device according to claim 1, in which a tool base diameter of said first milling tool and said second milling tool correspond to each other.

4. The device according to claim 1, in which a tool base diameter of said third milling tool is smaller than or equal to a tool base diameter of said first milling tool and said second milling tool.

5. The device according to claim 1, in which said device further comprises a fourth milling tool for contour machining the edge attached to said workpiece, said fourth milling tool having a tool base diameter equal to a tool base diameter of said third milling tool.

6. The device according to claim 5, in which said third milling tool and said fourth milling tool are formed as one component.

7. The device according to claim 1, in which said first milling tool and said third milling tool are formed as one component.

8. The device according to claim 1, in which said third milling tool and said second milling tool are formed as one component.

9. The device according to claim 1, further comprising an adjusting device for moving at least one of said milling tools in a coaxial axis direction of said device.

10. A method for machining a workpiece which includes segments of wood, wood-based materials, or synthetic materials, using the device of claim 1, having the following steps:
   flush milling a narrow side of an edge attached to said workpiece using said third milling tool,
   contour machining the edge attached to said workpiece using said first milling tool, wherein said second milling tool is in the resting position,
   adjusting said second milling tool to a machining position, and contour machining the edge attached to said workpiece using said second milling tool.

11. The method according to claim 10, further comprising the following step:
   contour machining the edge attached to said workpiece using said fourth milling tool, said contour machining taking place at times simultaneously with the flush milling of a narrow side of the edge by said third milling tool.

12. The device of claim 1 further comprising an adjusting device for moving all of said milling tools in a coaxial direction of said device.

* * * * *